June 10, 1958  J. P. LAWLOR  2,838,180
SLUDGE BLANKET CLARIFIER
Filed Feb. 27, 1956  3 Sheets-Sheet 1

INVENTOR:
Joseph P. Lawlor,
BY
Dawson, Tilton & Graham,
ATTORNEYS.

June 10, 1958     J. P. LAWLOR     2,838,180
SLUDGE BLANKET CLARIFIER

Filed Feb. 27, 1956     3 Sheets-Sheet 2

INVENTOR:
Joseph P. Lawlor,
BY
Dawson, Tilton & Graham,
ATTORNEYS.

June 10, 1958 J. P. LAWLOR 2,838,180
SLUDGE BLANKET CLARIFIER
Filed Feb. 27, 1956 3 Sheets-Sheet 3

INVENTOR:
Joseph P. Lawlor,
BY
Dawson, Tilton & Graham,
ATTORNEYS

United States Patent Office 2,838,180
Patented June 10, 1958

2,838,180
SLUDGE BLANKET CLARIFIER

Joseph P. Lawlor, Ames, Iowa, assignor to General Filter Company, Ames, Iowa, a corporation of Iowa Application February 27, 1956, Serial No. 568,077

6 Claims. (Cl. 210—528)

This invention relates to a sludge blanket clarifier, and more particularly to the type of sludge blanket clarifier which has the clarification zone outwardly of the mixing and flocculation zones. The invention has particular utility in connection with relatively large capacity sludge blanket clarifiers.

As sludge blanket clarifiers increase in size and the diameter of the tanks exceeds thirty to thirty-five feet, it becomes more and more difficult to remove sludge effectively from the clarification zone. It is therefore a principal object of the present invention to provide an improved means for removing sludge from the clarification zone of large-sized tanks.

Heretofore, I have suggested the use of a rotating sludge collecting pocket or concentrator within the clarification zone, as described and claimed in my Patent No. 2,721,173, issued October 18, 1955. The present invention in part represents a modified and improved form of the basic idea described in said application, and also in my co-pending application Serial No. 530,090, filed August 23, 1955. The present invention, however, includes many novel features not heretofore disclosed, as will be more apparent from the following discussion.

The present invention is shown in an illustrative embodiment in the accompanying drawings, in which—

Figure 1:
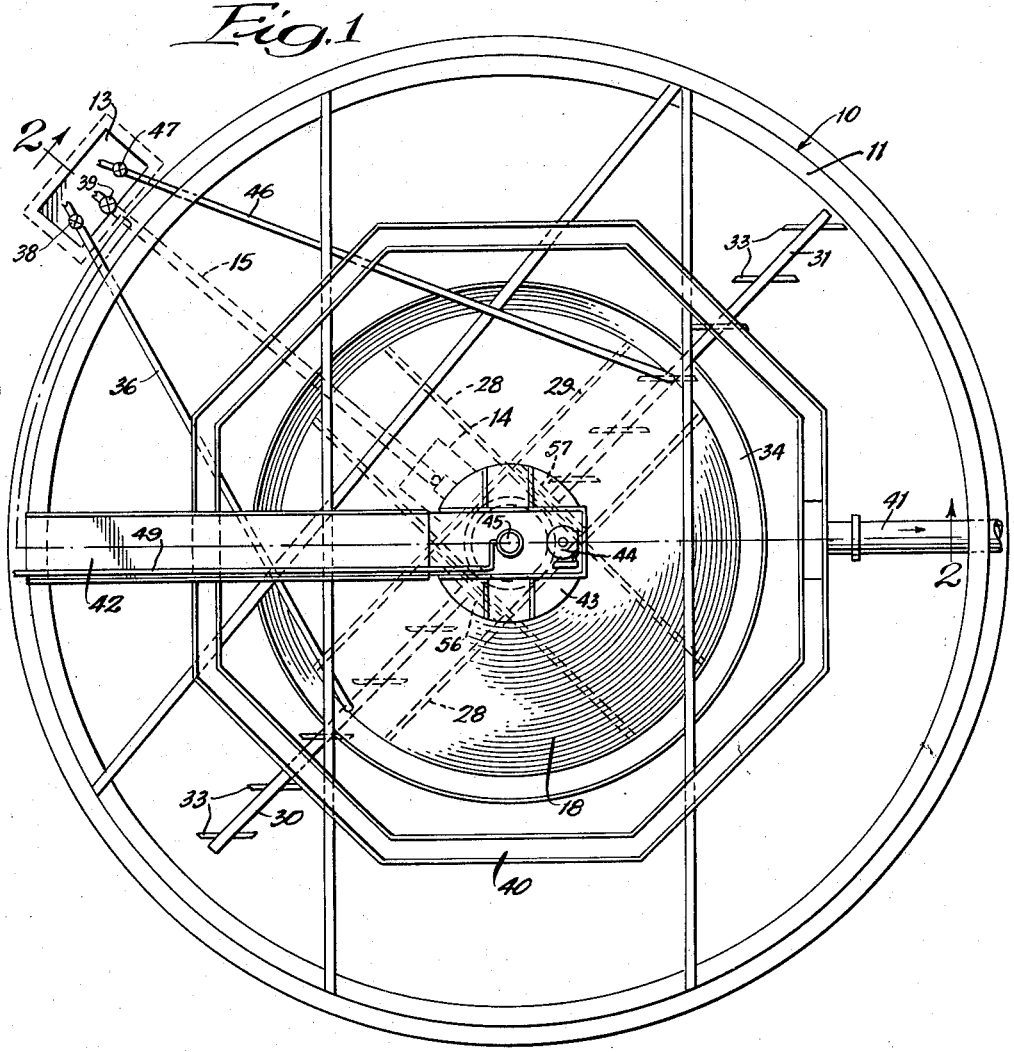
Figure 2:
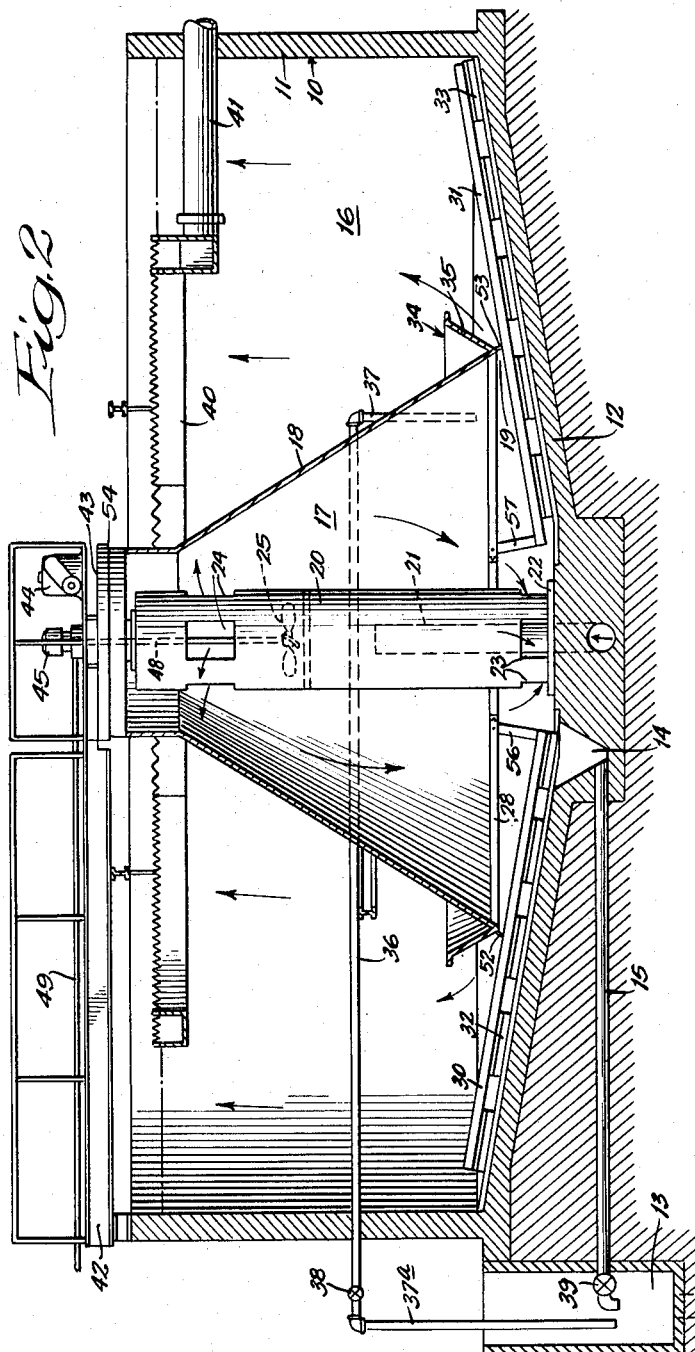
Figure 3:
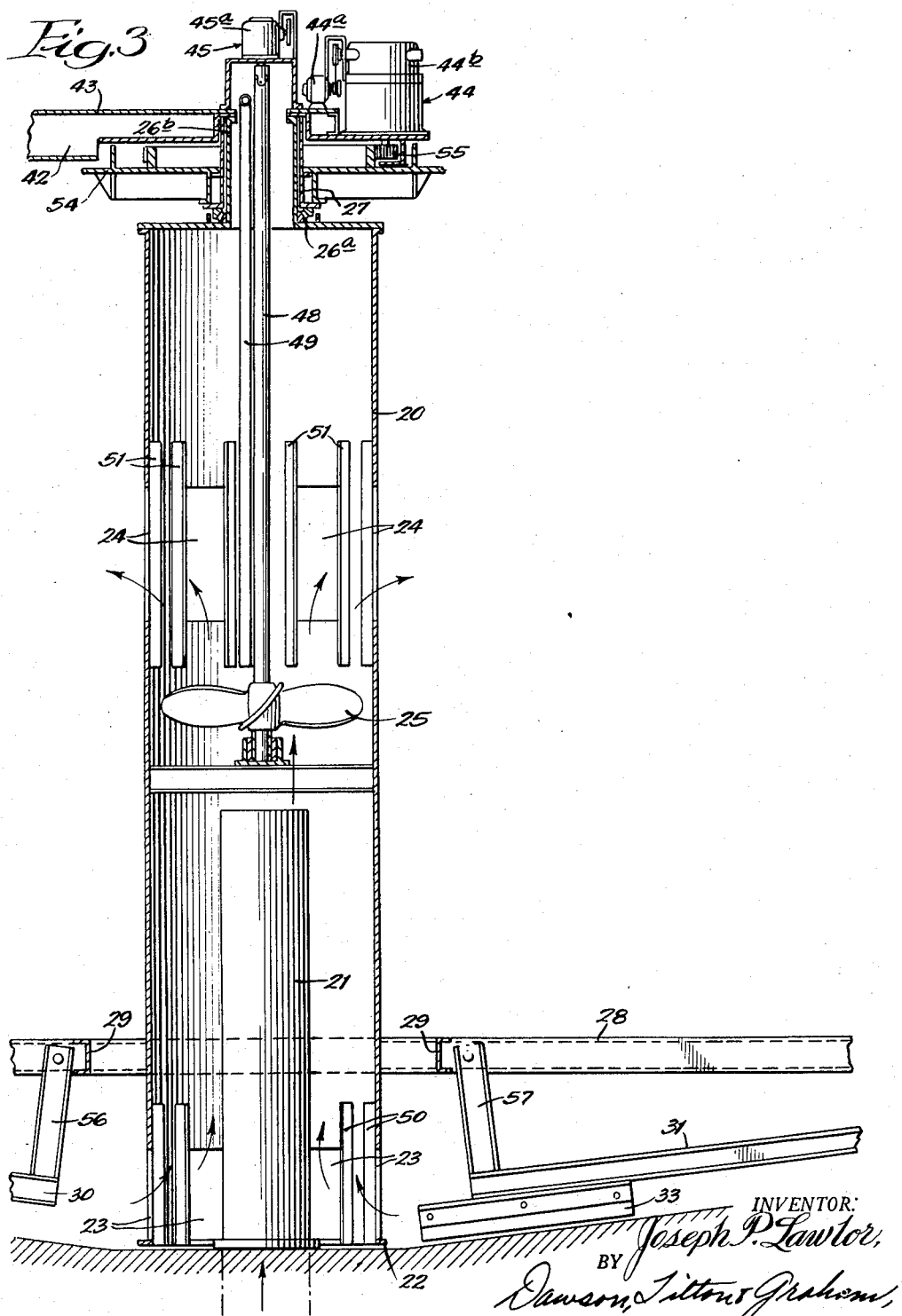

Figure 1 is a top or plan view of a sludge blanket clarifier embodying the novel features of this invention; Fig. 2, a vertical cross-sectional view of the same unit; and Fig. 3, an enlarged detail view, partly in section, of the central elements of the clarifier.

With reference to Figs. 1 and 2 of the drawings, there is shown a tank 10 which has a cylindrical side wall 11 and a dished bottom wall 12. If desired, the bottom wall of the tank can be substantially flat. In the illustration given, tank 10 is formed of reinforced concrete, but can also be formed of metal or other suitable material. For realizing the maximum benefits of the present invention, the tank should be at least thirty feet in diameter, but the invention can also have applications with tanks of smaller size. As part of the tank work, there is also provided a sludge sump 13 and a sludge pit 14 which communicate with sump 13 through a valve-controlled pipe 15.

Preferably, as shown, the interior of tank 10 is divided into an outer upwardly-enlarging clarification zone 16 and an inner downwardly-enlarging flocculation zone 17 by means of an upwardly-converging conical partition 18. In the illustration given, partition 18 is mounted in the central portion of tank 10 with its lower end at a spaced distance above the tank bottom 12 to provide a passage 19 between inner zone 17 and outer zone 16. Preferably, for reasons which will subsequently be explained in greater detail, conical partition 18 is mounted for rotation about its axis, which in the illustration given coincides with the central axis of cylindrical tank 10.

Also located in the central portion of tank 10 is a hollow vertically-extending cylinder 20 which is adapted to provide a fast mixing zone therein. In the illustration given, a raw water inlet pipe 21 extends upwardly from the bottom of tank 10 within mixing cylinder 20 to an elevated position, as shown more clearly in Fig. 3. In the operation of the tank, cylinder 20 remains fixed, and is therefore rigidly mounted on a base flange 22. Just above mounting flange 22 there is provided a series of openings 23 for the recirculation of sludge and water through cylinder 20. The cylinder wall between openings 23 is reinforced by angle members 50. Near the upper end of cylinder 20 and between reinforcing angles 51 there is provided a series of outlet openings 24 through which the mixed sludge and water is discharged into the flocculation zone 17 beneath partition 18. The desired circulation and mixing is promoted by an impeller assembly 25 which is positioned within cylinder 20 between the upper end of inlet pipe 21 and discharge outlets 24.

On bearing supports at 26a and 26b above the top of column 20 is provided a rotating collar 27 from which is suspended conical partition 18 through plate 54 which is rigidly attached to collar 27. To the bottom of partition 18 are attached laterally-extending arms 30 and 31 at 52 and 53 respectively. These arms are equipped with a plurality of scraper blades 32, 33, which are arranged to sweep over the tank bottom 12 and to move deposited sludge inwardly along the tank bottom towards the central portion of the bottom for recirculation through openings 23 and/or into sludge pit 14 for removal. The lower portion of conical partition 18 is reinforced by two pairs of lateral braces 28, 29, as shown more clearly in Fig. 1. Braces 29 also support the inner ends of arms 30, 31, through pairs of pivoted support links 56, 57.

In accordance with the present invention, an annular trough 34 is arranged around the lower end portion of the outside wall of partition 18 for collecting and concentrating sludge from the blanket of sludge which will normally be suspended within clarification zone 16 above and adjacent to the top of trough 34. Preferably, as shown, trough 34 is mounted on the outer lower end of partition 18, so that the partition 18 in effect provides an inward extension of the trough. As shown, it may be convenient to have the rear wall of the trough provided as an integral part of partition 18, with the outer wall of the trough provided by a separate outwardly and upwardly-extending partition 35. Partition 35 should be relatively short compared to partition 18, and should terminate well below the upper portion of tank 10.

It is also preferred, as shown more clearly in Fig. 2, to have a valve-equipped pipe 36 extend through one of the side walls of tank 10, being supported within the tank and extending to a position above trough 34. At its inner end, pipe 36 provides a downwardly-extending portion 37, which enters trough 34 and terminates near the bottom thereof. Pipe 36 and extension 37 are supported so as to remain stationary while the trough 34 rotates. The outer end of pipe 36 provides a downwardly-extending leg 37a which discharges into sump 13. Preferably, both valve 38 in line 36 and valve 39 in line 15 are automatic sludge removal valves, which are adapted to operate periodically as required, respectively, in the removal of sludge from trough 34 and sludge pit 14.

In the upper portion of tank 11, a launder box 40 is supported, and communicates with an outlet pipe 41 for the removal of the treated water in a manner well known in the art. A walkway 42 extends from one side of tank 10 to a position above cylinder 20 where it connects with a fixed platform 43 on which are mounted motor drive units 44 and 45. Unit 44 includes a motor 44a and drive assembly 44b. Similarly, unit 45 includes a motor (not shown) and a drive assembly 45a. Preferably, drive assembly 45a is of the variable speed type.

As shown more clearly in Fig. 1, a second pipe 46 similar to pipe 36 can be provided and equipped with an automatic sludge removal valve 47. Preferably, as shown, sludge removal pipes 36 and 46 have their inner end portions oppositely disposed so that at any one time they are withdrawing sludge from different portions of trough 34.

*Operation*

In the operation of the clarifier unit just described, motor unit 44 through drive pinion 55 rotates conical partition 18, annular trough 34 and scraper arms 30 and 31 at a relatively slow rate. At the same time, motor unit 45 is driving impeller 25 through shaft 48 at a higher rate of speed. In the continuous operation of the unit, or after approximately equilibrium conditions have been reached, sludge and water will be recirculating through cylinder 20 and mixed therein with the raw water entering through pipe 21, the mixture then being discharged at the top of cylinder 20 through outlet 24 into flocculation zone 17. It will be understood that the usual chemicals for the treatment can be introduced with the raw water through line 21, or can be introduced into the fast mixing zone within cylinder 20 through appropriate chemical supply lines, such as line 49 which extends over crosswalk 42, and down into cylinder 20.

With reference to one preferred embodiment, by way of illustration, conical partition 18 and arms 30 and 31 would be rotated at a rotational speed such that the linear speed of the outer end of arms 30 and 31 would approximate two feet per minute. Impeller 25 would be driven at a speed sufficient to recirculate the sludge and water through cylinder 20 at from four to five times the rate of flow of the raw water being introduced through line 21.

The mixture of water and flocculated material will pass beneath partition 18 through passage 19 into the lower portion of clarifying zone 16. As it moved along lower partition 35, which forms the outside of trough 34, it will be deflected outwardly and into the sludge blanket which will be suspended within zone 16 from the level of the top of trough 34 upwardly to a spaced distance below launder 40. Preferably, in operation, the upper portion of zone 16 is substantially free from flocculated material, thereby permitting completely clarified water to overflow into launder 40 and be discharged through outlet pipe 41.

As the particles increase in size and descend from the sludge blanket in the central area of clarification zone 16, they will either fall directly into trough 34 or they will fall upon partition 18 and thereby be deflected into trough 34. In this way, trough 34 can function as a sludge collector over a relatively large area of the clarification zone, while still being quite small in size. By having the fixed portions of pipes 36 and 46 extending into trough 34, the sludge as it collects within the trough is gently stirred so that it tends to be dewatered and concentrated. The heavier sludge along the bottom of trough 34 is intermittently removed through the discharge lines 36 and 46, as required to prevent trough 34 from overflowing. Sludge descending from the blanket outwardly of trough 34 will fall upon the tank bottom 12 and be moved inwardly by the action of the blades 32 and 33 on arms 30 and 31, respectively. The heavier sludge will be moved into pit 14, and then periodically removed therefrom to sludge sump 13. Some of the sludge which is moved towards the center of the tank by the scraper arms will also be recirculated through the fast mixing zone within cylinder 20 in the manner previously described.

While in the foregoing specification this invention has been described in relation to a specific embodiment thereof and many details have been set forth for purposes of illustration, it will be apparent to those skilled in the art that the invention is susceptible to other embodiments and that many of the details set forth herein can be varied without departing from the basic conception.

I claim:

1. In a sludge blanket clarifier, a tank providing inner mixing and flocculation zones and an outer clarification zone wherein a sludge blanket can be maintained, an upwardly-converging conical partition mounted in the central portion of said tank for rotation about its vertical axis, said partition separating the inner mixing and flocculation zones from the outer clarification zone and being spaced upwardly from the tank bottom to provide a passage therebeneath between said inner and outer zones, means for rotating said partition about its axis, an annular trough extending around the lower end portion of the outside wall of said partition for collecting and concentrating sludge from said blanket, means for stirring the sludge in said trough as said trough rotates, and means for removing sludge from the lower portion of said trough.

2. In a sludge blanket clarifier, a tank, a vertically-extending supporting structure mounted for rotation about a vertical axis near the center of said tank, laterally-extending arms connecting the lower portion of said supporting structure for rotation therewith, said arms carrying sludge scraper blades arranged to sweep over the bottom of said tank, an upwardly-converging conical partition provided by said supporting structure, said partition separating said tank into inner mixing and flocculation zone and an outer clarification zone and being spaced from the bottom of said tank to provide a passage therebeneath between said inner and outer zones, and an annular trough mounted on the lower portion of the outside of said partition for rotation therewith, said trough extending entirely around said partition and cooperating therewith to provide an enlarged area for the collection of sludge from said clarifying zone.

3. In a sludge blanket clarifier, a tank of at least thirty feet in diameter, a supporting structure mounted for rotation about a vertical axis near the center of said tank, laterally-extending arms connected to the lower portion of said supporting structure for rotation therewith, a plurality of sludge scraper blades mounted on said arms for sweeping over the bottom of said tank, an upwardly-converging conical partition provided by said supporting structure, the lower end portion of said partition being secured to said arms, an outwardly and upwardly-extending partition mounted on the lower end of said conical partition and forming therewith an annular trough about the lower peripheral portion of said conical partition, means for rotating said supporting structure, and the elements carried thereby, at least one stationary pipe having an end portion extending into said annular trough so that as said trough rotates said pipe end portion traverses the circumference of said trough, and still another partition means arranged within said supporting structure to provide a fast mixing zone separate from said flocculation zone.

4. In a sludge blanket clarifier having a tank providing inner mixing and flocculation zones and an outer clarification zone wherein a sludge blanket can be maintained, an upwardly-converging conical partition mounted in the central portion of said tank for rotation about its vertical axis, said partition separating the inner mixing and flocculation zones from the outer clarification zone and being spaced upwardly from the tank bottom to provide a passage therebeneath between said inner and outer zones, means for rotating said partition about its axis, and an annular trough disposed concentrically with respect to the said vertical axis of said partition and outwardly of the lower portion of the outside wall of said partition for collecting and concentrating sludge from said blanket, said trough being mounted for rotation in unison with said partition.

5. In a sludge blanket clarifier including a tank providing a central mixing and flocculation zones and an outer clarification zone, a supporting structure mounted for rotation about a vertical axis near the center of said tank adjacent said mixing and flocculation zones, laterally-extending arms connected to the lower portion of said supporting structure for rotation therewith, a plurality of sludge scraper blades mounted on said arms for sweeping over the bottom of said tank and beneath said clarification zone, an annular trough disposed outwardly of said supporting structure and above said arms within said clarification zone, said supporting structure, said arms, and said trough being arranged to rotate together, and means for simultaneously rotating said supporting structure, said arms, and said annular trough, means for stirring the sludge in said trough as said trough rotates, and means for removing sludge from the lower portion of said trough.

6. In a sludge blanket clarifier, a tank, an upwardly-converging conical partition mounted in the central portion of said tank, said partition separating the inner mixing and flocculation zones from the outer clarification zone and being spaced upwardly from the tank bottom to provide a passage therebeneath between said inner and outer zones, mixing arms extending outwardly from the central portion of said tank over said tank bottom and beneath said partition to within the lower portion of said outer zone, a plurality of sludge scraper blades mounted on said arms for sweeping over the bottom of said tank, an annular trough disposed outwardly of the lower portion of said partition and above said arms for collecting and concentrating sludge from within said outer zone, said trough and said arms being mounted for rotation about a common axis, and means for simultaneously rotating said arms and said trough.

References Cited in the file of this patent

UNITED STATES PATENTS

| | | |
|---|---|---|
| 823,688 | Kremer | June 19, 1906 |
| 2,127,314 | Spaulding | Aug. 16, 1938 |
| 2,702,124 | Stengel | Feb. 15, 1955 |